(12) United States Patent
Ueda et al.

(10) Patent No.: US 12,223,541 B2
(45) Date of Patent: Feb. 11, 2025

(54) VIRTUAL TRY-ON SYSTEM, VIRTUAL TRY-ON METHOD, COMPUTER PROGRAM PRODUCT, AND INFORMATION PROCESSING DEVICE

(71) Applicants: KABUSHIKI KAISHA TOSHIBA, Minato-ku (JP); TOSHIBA DIGITAL SOLUTIONS CORPORATION, Kawasaki (JP)

(72) Inventors: Hiroki Ueda, Suginami (JP); Hisao Yoshioka, Chofu (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 1113 days.

(21) Appl. No.: 16/995,873

(22) Filed: Aug. 18, 2020

(65) Prior Publication Data

US 2020/0380594 A1    Dec. 3, 2020

Related U.S. Application Data

(63) Continuation of application No. PCT/JP2018/041860, filed on Nov. 12, 2018.

(30) Foreign Application Priority Data

Feb. 21, 2018  (JP) ................................ 2018-029041

(51) Int. Cl.
*G06Q 30/0601* (2023.01)
*G06N 3/08* (2023.01)
(Continued)

(52) U.S. Cl.
CPC ........... *G06Q 30/0643* (2013.01); *G06N 3/08* (2013.01); *G06N 20/00* (2019.01); *G06V 10/56* (2022.01);
(Continued)

(58) Field of Classification Search
CPC ..................... G06N 3/08; G06N 20/00; G06Q 30/06–0645; G06Q 30/08; G06T 1/00;
(Continued)

(56) References Cited

U.S. PATENT DOCUMENTS

| | | |
|---|---|---|
| 9,218,794 B2 | 12/2015 | Sugita et al. |
| 9,940,749 B2 * | 4/2018 | Chen ....................... G06V 40/10 |
| 11,544,905 B2 * | 1/2023 | Lee ......................... G06V 40/10 |
| 2016/0189431 A1 | 6/2016 | Ueda et al. |

(Continued)

FOREIGN PATENT DOCUMENTS

| | | | |
|---|---|---|---|
| CN | 103886117 A | 6/2014 | |
| CN | 104978762 A * | 10/2015 | ......... G06K 9/00362 |

(Continued)

OTHER PUBLICATIONS

International Search Report issued Jan. 29, 2019 in PCT/JP2018/041860 filed on Nov. 12, 2018, 2 pages.

*Primary Examiner* — Adam L Levine
(74) *Attorney, Agent, or Firm* — Maier & Maier, PLLC

(57) ABSTRACT

A virtual try-on system includes one or more hardware processors configured to function as a learning unit, an acquisition unit, a deriving unit, and a generation unit. The learning unit learns, by machine learning using three-dimensional data of a try-on person, a learning model using a teacher try-on person image as input data, and using a body shape parameter indicating a body shape of the try-on person represented by the teacher try-on person image and compositing position information of a clothing image in the teacher try-on person image as output data. The acquisition unit acquires a try-on person image. The deriving unit derives output data of the try-on person represented by the try-on person image using the try-on person image and the learning model. The generation unit generates a virtual try-on image by compositing the try-on person image and the clothing image using the derived output data.

19 Claims, 8 Drawing Sheets

(51) Int. Cl.
*G06N 20/00* (2019.01)
*G06V 10/56* (2022.01)
*G06V 10/60* (2022.01)
*G06V 10/764* (2022.01)
*G06V 10/82* (2022.01)
*G06V 40/10* (2022.01)

(52) U.S. Cl.
CPC ............ *G06V 10/60* (2022.01); *G06V 10/764* (2022.01); *G06V 10/82* (2022.01); *G06V 40/103* (2022.01)

(58) Field of Classification Search
CPC .. G06T 5/50; G06T 7/00; G06T 11/80; G06V 10/56; G06V 10/60; G06V 10/764; G06V 10/82; G06V 40/103; G16Y 10/00–90; H04N 7/18
See application file for complete search history.

(56) References Cited

U.S. PATENT DOCUMENTS

| | | | |
|---|---|---|---|
| 2016/0203361 A1* | 7/2016 | Black | G06T 7/75 382/203 |
| 2019/0026954 A1* | 1/2019 | Vats | G06T 13/40 |
| 2019/0102937 A1* | 4/2019 | Black | G06T 19/20 |
| 2020/0233239 A1* | 7/2020 | Schwarz | G02C 13/005 |
| 2023/0010378 A1* | 1/2023 | Allione | G06V 40/165 |

FOREIGN PATENT DOCUMENTS

| | | | | |
|---|---|---|---|---|
| JP | 2014-165613 A | | 9/2014 | |
| JP | 2016-122411 A | | 7/2016 | |
| KR | 20210030747 A | * | 3/2021 | |
| WO | WO-2015155550 A1 | * | 10/2015 | ......... G06Q 30/0201 |
| WO | WO-2020131518 A1 | * | 6/2020 | ............ G06N 3/044 |
| WO | WO-2020171237 A1 | * | 8/2020 | |
| WO | WO-2021074630 A1 | * | 4/2021 | ............ G06T 11/60 |

* cited by examiner

VIRTUAL TRY-ON SYSTEM, VIRTUAL TRY-ON METHOD, COMPUTER PROGRAM PRODUCT, AND INFORMATION PROCESSING DEVICE

CROSS-REFERENCE TO RELATED APPLICATIONS

This application is a continuation of PCT International Application No. PCT/JP2018/041860 filed on Nov. 12, 2018 which claims the benefit of priority from Japanese Patent Application No. 2018-029041, filed on Feb. 21, 2018, the entire contents of which are incorporated herein by reference.

FIELD

Embodiments described herein relate generally to a virtual try-on system, a virtual try-on method, a computer program product, an information processing device, and learning data stored in a computer-readable medium.

BACKGROUND

There is disclosed a technique of displaying a virtual image representing a state of wearing clothes as a try-on target. For example, there is disclosed a technique of displaying a composite image representing a state in which a user tries clothes on.

However, in the related art, at the time of displaying a virtual try-on image, a clothing image and a try-on person image are composited by acquiring information regarding a three-dimensional shape of a try-on person, and by performing shape-modification and positioning in accordance with the acquired information regarding the three-dimensional shape. As such, in the related art, it has been difficult to provide a virtual try-on image that is composited with a simple configuration with high accuracy.

DETAILED DESCRIPTION

A virtual try-on system includes one or more hardware processors configured to function as a learning unit, an acquisition unit, a deriving unit, and a generation unit. The learning unit learns, by machine learning using three-dimensional data of a try-on person, a learning model using a teacher try-on person image as input data, and using a body shape parameter indicating a body shape of the try-on person represented by the teacher try-on person image and compositing position information of a clothing image in the teacher try-on person image as output data. The acquisition unit acquires a try-on person image. The deriving unit derives output data of the try-on person represented by the try-on person image using the try-on person image and the learning model. The generation unit generates a virtual try-on image by compositing the try-on person image and the clothing image using the derived output data. The following describes an embodiment of a virtual try-on system, a virtual try-on method, a virtual try-on computer program product, an information processing device, and learning data stored in a computer-readable medium in detail with reference to the attached drawings.

Figure 1:
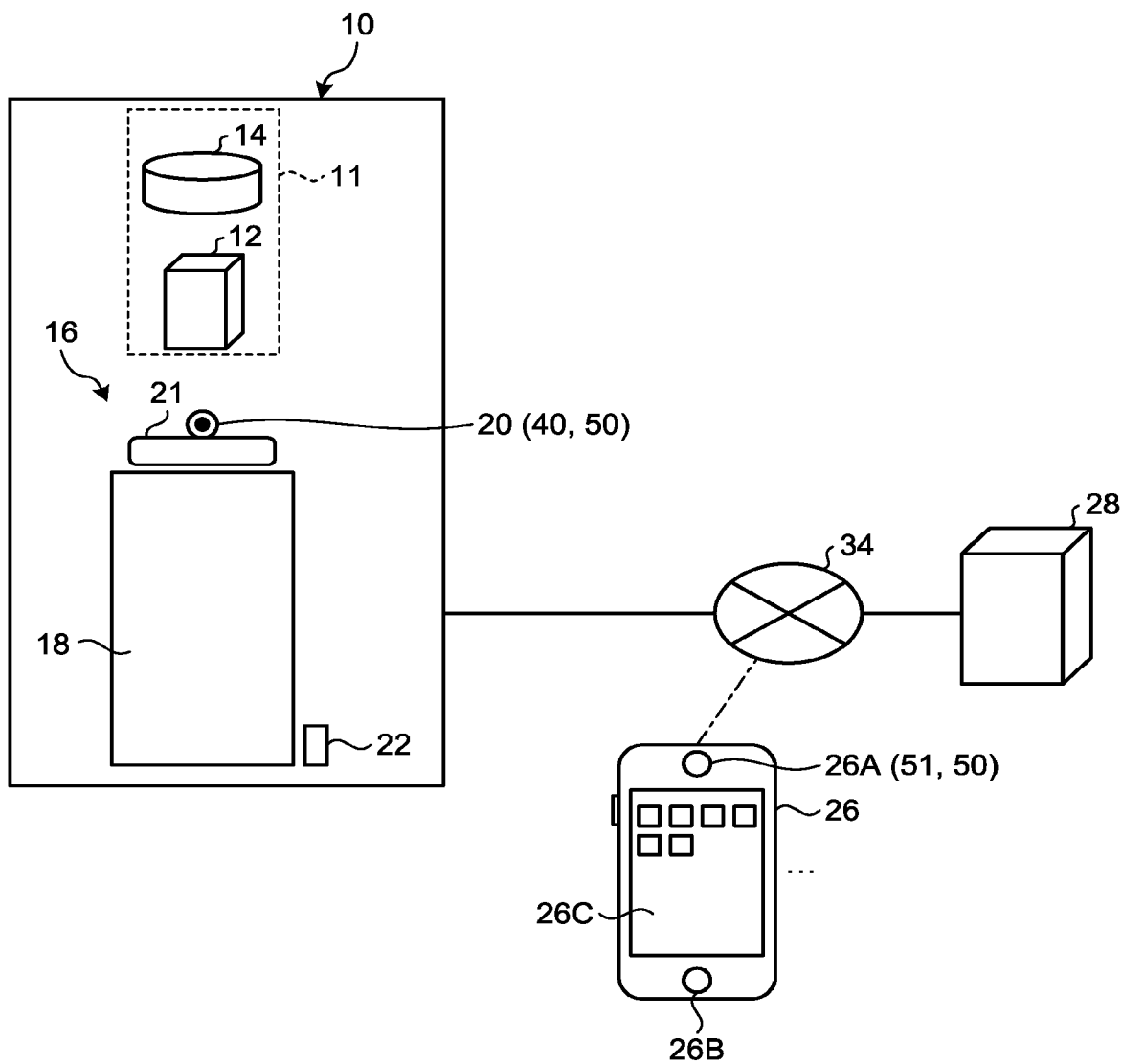
FIG. 1 is a schematic diagram of a virtual try-on system.

FIG. 1 is a schematic diagram of a virtual try-on system 1 according to the present embodiment.

The virtual try-on system 1 includes an information processing device 10, a terminal device 26, and an external server 28. The information processing device 10, the terminal device 26, and the external server 28 are connected via a communication line 34. The communication line 34 is a well-known network. The information processing device 10, the terminal device 26, and the external server 28 are connected to the communication line 34 in a wired or wireless manner.

The present embodiment describes a case in which the virtual try-on system 1 includes one information processing device 10, one external server 28, and one terminal device 26 by way of example. However, the virtual try-on system 1 may have a configuration including one or a plurality of the information processing devices 10, one or a plurality of the external servers 28, and one or a plurality of the terminal devices 26.

The terminal device 26 is a device that displays a virtual try-on image. The virtual try-on image is a composite image obtained by compositing a clothing image on a try-on person image 50 of a try-on person. In other words, the virtual try-on image is an image representing a state in which the try-on person virtually tries clothes on. In the present embodiment, the terminal device 26 generates and displays the virtual try-on image using a learning model generated by the information processing device 10. Details of the learning model will be described later.

The terminal device 26 is operated by the try-on person who virtually tries clothes on. The terminal device 26 is, for example, a well-known personal computer, a portable mobile terminal, a smartphone, and the like.

The try-on person is a target who tries clothes on. It is sufficient that the try-on person is a target who tries clothes on, and may be a living thing or a non-living thing. Examples of the living thing include a person. The living thing is not limited to a person, and may be an animal other than a person such as a dog or a cat. Examples of the non-living thing include a mannequin that mimics a shape of a human body or an animal and other objects, but the non-living thing is not limited thereto. The try-on person may be a living thing or a non-living thing in a state of wearing clothes. The present embodiment describes a case in which the try-on person is a person.

In the present embodiment, in a case of collectively describing the try-on person and a person other than the try-on person, the person is simply referred to as a user.

The clothes are items that can be worn by the try-on person. Examples of the clothes include an upper garment, a skirt, trousers, shoes, a hat, an accessory, a swimming suit, and a wig. The clothes are not limited to an upper garment, a skirt, trousers, shoes, a hat, an accessory, a swimming suit, a wig, and the like.

The terminal device 26 includes a photographing unit 26A, an input unit 26B, and a display unit 26C. The photographing unit 26A photographs the try-on person to obtain a try-on person image 51 of the try-on person. The try-on person image 51 is an example of the try-on person image 50. The try-on person image 51 represents the try-on person image 50 photographed by the terminal device 26.

The photographing unit 26A is a well-known digital camera. Specifically, the try-on person image 51 (try-on person image 50) is try-on person image data. In the present embodiment, for simplifying the description, the try-on person image data is simply referred to as the try-on person image 51 (try-on person image 50).

A data format of the try-on person image 50 is not limited. For example, the try-on person image 50 is an image having a pixel value indicating a color, luminance, and the like of the try-on person defined for each pixel. The try-on person image 50 is not limited to a bit map image.

The display unit 26C displays various images. In the present embodiment, the display unit 26C displays a virtual try-on image. The display unit 26C is a well-known liquid crystal display (LCD), an organic electro-luminescence (EL), and the like.

The input unit 26B receives an operation instruction from the user. The input unit 26B is a keyboard, a mouse, an input button, and the like. The display unit 26C and the input unit 26B may be integrally configured. In this case, the display unit 26C and the input unit 26B may be configured as a touch panel.

The external server 28 is a server device that can process a clothing image and big data. In the present embodiment, the external server 28 stores the clothing image used for the virtual try-on image and a clothing ID for identifying the clothing image that are associated with each other in advance. A plurality of clothes' images (i.e., clothing images) are stored in the external server 28 in advance in an associated manner with respective clothing IDs. The external server 28 analyzes purchase information and the like of the user accumulated in various server devices on the Internet by processing big data.

The information processing device 10 is a device for generating the learning model. The learning model is an application program for deriving, from the try-on person image, a body shape parameter of the try-on person and the compositing position information indicated by the try-on person image. Details of the learning model will be described later. The information processing device 10 is accessed by one or a plurality of the terminal devices 26, and provides the learning model on which learning is performed, output data derived from the learning model, and the like.

The information processing device 10 includes an information processing unit 11 and a main body unit 16. The information processing unit 11 includes a control unit 12 and a storage unit 14. The control unit 12 controls each unit of the device disposed in the information processing device 10. The storage unit 14 is a well-known hard disk device that stores various kinds of data.

The main body unit 16 includes a display unit 18, a photographing unit 20, a three-dimensional data acquisition unit 21, and an input unit 22.

The input unit 22 receives various operation instructions made by the user. The input unit 22 is, for example, a keyboard, a touch panel, a pointing device, a mouse, and the like.

The photographing unit 20 photographs the try-on person to obtain the try-on person image 50 of the try-on person. In the following description, the try-on person image 50 photographed by the photographing unit 20 disposed in the information processing device 10 is referred to as a teacher try-on person image 40.

The teacher try-on person image 40 is the try-on person image 50 used for generating the learning model. The photographing unit 20 is a well-known photographing device that can acquire the teacher try-on person image 40. The photographing unit 20 is, for example, a digital camera.

By way of example, FIG. 1 illustrates one photographing unit 20. However, the information processing device 10 may have a configuration including a plurality of the photographing units 20. In this case, the photographing units 20 may be disposed at positions at which the photographing units 20 can photograph the try-on person from photographing directions different from each other. That is, the respective photographing units 20 may be disposed at positions at which the photographing units 20 can photograph the teacher try-on person image 40 at photographing angles different from each other.

The information processing device 10 may also have a configuration including a plurality of different types of photographing units 20. A difference in the type of the photographing unit 20 means a difference in at least one of an angle of view, a lens (a telephoto lens, a wide-angle lens, a short focus lens, a zoom lens, a fisheye lens, and the like), photographing magnification, resolution, and a manufacturer of the photographing unit 20.

The three-dimensional data acquisition unit 21 is an appliance for obtaining three-dimensional data of the try-on person. The three-dimensional data is, for example, three-dimensional (3D) feature data, surface data, solid data, 3D computer-aided design (CAD) data, a depth map, and the like.

The three-dimensional data acquisition unit 21 may be a well-known appliance that can obtain the three-dimensional data described above. For example, in a case in which the three-dimensional data is a depth map, the three-dimensional data acquisition unit 21 is a photographing device that acquires the depth map by photographing. The depth map may be called a distance image in some cases. The depth map is an image in which a distance from the three-dimensional data acquisition unit 21 is defined for each pixel.

In the present embodiment, the photographing unit 20 and the three-dimensional data acquisition unit 21 photograph the try-on person at the same timing. The photographing unit 20 and the three-dimensional data acquisition unit 21 are controlled to successively perform photographing at the same time in synchronization with each other by the control unit 12. The photographing unit 20 and the three-dimensional data acquisition unit 21 then successively output, to the control unit 12, the teacher try-on person image 40 and the three-dimensional data of the try-on person that are obtained by photographing.

In the present embodiment, the photographing unit 20 and the three-dimensional data acquisition unit 21 photograph the try-on person at a plurality of photographing angles. Accordingly, the photographing unit 20 obtains pieces of the teacher try-on person image 40 corresponding to the respective photographing angles. The three-dimensional data acquisition unit 21 obtains pieces of the three-dimensional data corresponding to the respective photographing angles.

The photographing angles may be different from each other. For example, each of the photographing angles is a photographing angle for each angle determined in advance at the time when the try-on person is rotated by 360° about a trunk thereof as a rotation axis. Specifically, the photographing angle may be each of the photographing angles from 0° to 360° in increments of a predetermined angle (for example, 5°). The photographing angle of 0° represents, for example, a photographing angle in a state in which the try-on person faces the display unit 18 from the front. The photographing angle of 180° represents, for example, a photographing angle in a state in which the try-on person turns his/her back to the display unit 18.

Specifically, the photographing unit 20 and the three-dimensional data acquisition unit 21 are disposed at the respective positions at which the photographing unit 20 and the three-dimensional data acquisition unit 21 can photograph the try-on person facing a display surface of the display unit 18 from a plurality of different photographing directions. By obtaining taken photographed images, the photographing unit 20 and the three-dimensional data acquisition unit 21 may obtain the teacher try-on person images 40 and pieces of the three-dimensional data corresponding to the respective photographing angles.

At the time when the try-on person faces the display surface of the display unit 18, the control unit 12 may perform control to output a message for prompting the try-on person to take a predetermined pose. For example, the control unit 12 may perform control to output a message for prompting the try-on person to take a pose so as to obtain an image representing a state in which the try-on person is photographed by holding the photographing unit such as a camera by himself/herself to perform photographing (what is called self-photographing).

For example, the control unit 12 displays the message on the display unit 18. Alternatively, for example, the configuration may be such that the main body unit 16 further includes a speaker, and the control unit 12 outputs the message from the speaker.

In this case, the photographing unit 20 can photograph the try-on person taking a pose similar to that at the time of self-photographing, and obtain the teacher try-on person image 40 of the try-on person taking the pose.

By successively perform photographing, the photographing unit 20 and the three-dimensional data acquisition unit 21 can obtain a plurality of the teacher try-on person images 40 and pieces of the three-dimensional data the photographing times of which are different from each other.

The display unit 18 is a device that displays various images. The display unit 18 is, for example, a well-known display device such as a liquid crystal display device and organic electro luminescence (EL). In the present embodiment, the display unit 18 displays the teacher try-on person image 40 photographed by the photographing unit 20. Accordingly, the try-on person facing the display unit 18 can visually recognize the display unit 18 while having a sense of visually recognizing a mirror. Alternatively, the display unit 18 may display a superimposed image (described later) generated by the control unit 12 (details will be described later).

The display unit 18 is, for example, incorporated in one of surfaces of a housing having a rectangular shape. The present embodiment describes a case in which the display unit 18 is configured to have a size equal to or larger than a life size of a person. The size of the display unit 18 is not limited to this size.

Figure 2:
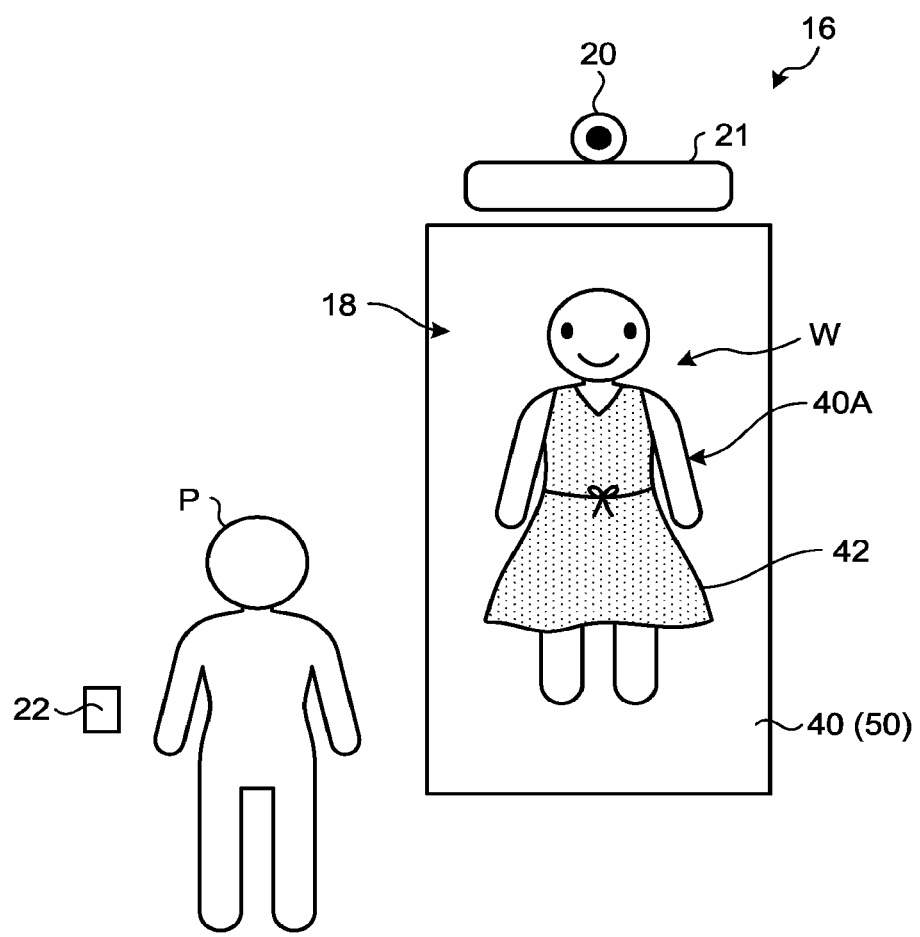
FIG. 2 is a schematic diagram illustrating a positional relation between a main body unit and a try-on person.

FIG. 2 is a schematic diagram illustrating a positional relation between the main body unit 16 and a try-on person P according to the present embodiment.

The control unit 12 (not illustrated in FIG. 2) displays, on the display unit 18, the teacher try-on person image 40 of the try-on person P, a superimposed image W indicating a state in which the try-on person P tries various clothes on, and the like. By way of example, FIG. 2 illustrates the superimposed image W of the teacher try-on person image 40 and a clothing image 42. For example, the try-on person P such as a person visually recognizes a superimposed image W2 presented on the display unit 18 from a position facing the display surface of the display unit 18. A photographing position and a photographing direction of the photographing unit 20 and the three-dimensional data acquisition unit 21 are adjusted in advance so as to be able to photograph the try-on person P facing the display surface of the display unit 18.

Figure 3:
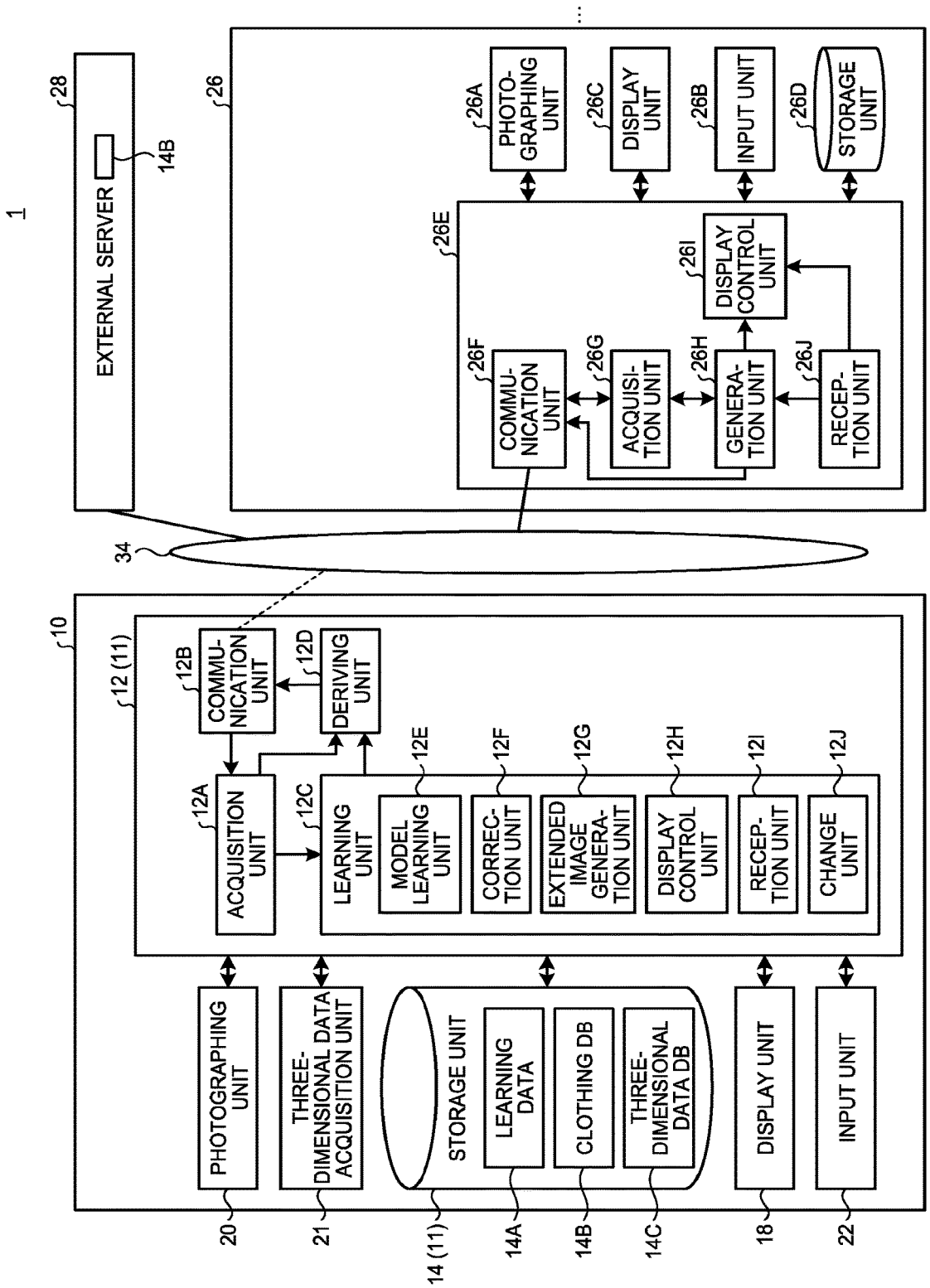
FIG. 3 is a functional block diagram of an information processing device and a terminal device.

Returning to FIG. 1, the description will be continued. Next, the following describes functions of the information processing device 10 and the terminal device 26 included in the virtual try-on system 1. FIG. 3 is an example of a functional block diagram of the information processing device 10 and the terminal device 26 included in the virtual try-on system 1.

First, the following describes the information processing device 10. The information processing device 10 includes the control unit 12, the photographing unit 20, the three-dimensional data acquisition unit 21, the storage unit 14, the display unit 18, and the input unit 22. The photographing unit 20, the three-dimensional data acquisition unit 21, the storage unit 14, the display unit 18, and the input unit 22 are connected to the control unit 12 to be able to exchange data and signals.

The storage unit 14 stores various kinds of data. In the present embodiment, the storage unit 14 stores learning data 14A, a clothing DB 14B, and a three-dimensional data DB 14C. Details of the learning data 14A will be described later.

In the clothing DB 14B, a clothing ID is associated with a clothes' image (a clothing image). The clothing ID is identification information for identifying a corresponding clothes' image (clothing image). The clothing DB 14B may be stored in the external server 28. The present embodiment describes, as an example, a case in which the clothing DB 14B associating a plurality of clothing IDs with clothing images corresponding to the respective clothing IDs is stored in the storage unit 14 in advance. The clothing DB 14B stored in the information processing device 10 may be updated as appropriate by the clothing DB 14B stored in the external server 28.

In the three-dimensional data DB 14C, the three-dimensional data of the try-on person is associated with a teacher try-on person image ID. The teacher try-on person image ID is identification information for identifying the teacher try-on person image 40. That is, in the present embodiment, the storage unit 14 associates each teacher try-on person image 40 with the three-dimensional data of the try-on person represented by the teacher try-on person image 40 to be stored. The three-dimensional data DB 14C is updated by the control unit 12.

The control unit 12 includes an acquisition unit 12A, a communication unit 12B, a learning unit 12C, and a deriving unit 12D. The learning unit 12C includes a model learning unit 12E, a correction unit 12F, an extended image generation unit 12G, a display control unit 12H, a reception unit 12I, and a change unit 12J.

Some of or all of the acquisition unit 12A, the communication unit 12B, the learning unit 12C, the deriving unit 12D, the model learning unit 12E, the correction unit 12F, the extended image generation unit 12G, the display control unit 12H, the reception unit 12I, and the change unit 12J may be implemented by causing a processing device such as a central processing unit (CPU) to execute a computer program, that is, by software, may be implemented by hardware such as an integrated circuit (IC), or may be implemented by using both of software and hardware, for example.

The communication unit 12B communicates with the external server 28 and the terminal device 26 via the communication line 34.

The acquisition unit 12A acquires the teacher try-on person image 40. In the present embodiment, the acquisition unit 12A acquires the teacher try-on person image 40 from the photographing unit 20. As described above, there may be a case in which the photographing unit 20 obtains, by photographing, a plurality of the teacher try-on person images 40 that are different in at least one of a photographing time, a photographing angle, a type of the photographing unit 20 used for photographing, and a pose of the try-on person at the time of photographing for one try-on person. In this case, the acquisition unit 12A acquires a plurality of types of teacher try-on person images 40 for one try-on person. The acquisition unit 12A may also acquire the teacher try-on person image 40 for each of a plurality of the try-on persons. Alternatively, the acquisition unit 12A may acquire one teacher try-on person image 40 including a plurality of the try-on persons.

The acquisition unit 12A may acquire the teacher try-on person image 40 from the storage unit 14 or the external server 28. The present embodiment describes a case in which the acquisition unit 12A acquires the teacher try-on person image 40 from the photographing unit 20 by way of example.

The acquisition unit 12A also acquires the three-dimensional data of the try-on person. In the present embodiment, the acquisition unit 12A acquires the three-dimensional data of the try-on person represented by the teacher try-on person image 40 from the three-dimensional data acquisition unit 21.

The acquisition unit 12A also acquires characteristic information of the try-on person input by the input unit 22.

The characteristic information represents, for example, an appearance characteristic and an inner characteristic of the try-on person. The appearance characteristic represents a characteristic that is estimated or analyzed based on an external appearance of the try-on person. The inner characteristic represents a characteristic that is not estimated or analyzed, or hardly estimated and analyzed based on the external appearance of the try-on person.

Specifically, the characteristic information represents at least one of a color of skin of the try-on person, an exposure degree from clothing, a hairstyle, nationality, a dominant hand, personality, a recommended photographing direction, a color of eyes, a color of hair, a favorite color, a gender, an age, and a recommended pose. The recommended photographing direction represents a photographing direction preferred by the try-on person. The exposure degree from clothing represents a position and a ratio of a region exposed from the clothing (that is, an externally exposed skin region) in a photographed subject image. The recommended pose represents a pose preferred by the try-on person (preferred posture or movement) at the time of photographing.

For example, the try-on person inputs the characteristic information of the try-on person by operating the input unit 22 when the photographing unit 20 photographs the teacher try-on person image 40. Accordingly, the acquisition unit 12A acquires the characteristic information of the try-on person P indicated by the teacher try-on person image 40.

The acquisition unit 12A also acquires the try-on person image 51, which is photographed by the terminal device 26, from the terminal device 26 via the communication unit 12B and the communication line 34. The acquisition unit 12A also acquires display result information indicating a display result of the virtual try-on image displayed by the terminal device 26 from the terminal device 26 via the communication unit 12B and the communication line 34. Details of the display result information will be described later.

The learning unit 12C learns the learning model. As described above, the learning model is an application program for deriving, from the try-on person image 50, the body shape parameter of the try-on person and the compositing position information indicated by the try-on person image 50. In the present embodiment, the learning model is a learning model using the teacher try-on person image 40 as input data, and using the body shape parameter indicating the body shape of the try-on person represented by the teacher try-on person image 40 and the compositing position information of the clothing image in the teacher try-on person image 40 as output data. In other words, the learning model is an application program for modeling an input/output relation between the teacher try-on person image 40, and the body shape parameter and the compositing position information to be calculable. The learning model may also be expressed by a numerical expression such as a function.

In the present embodiment, the learning unit 12C learns the learning model by machine learning using the three-dimensional data of the try-on person. Specifically, the learning unit 12C learns the learning model by machine learning using the learning data.

Figure 4:
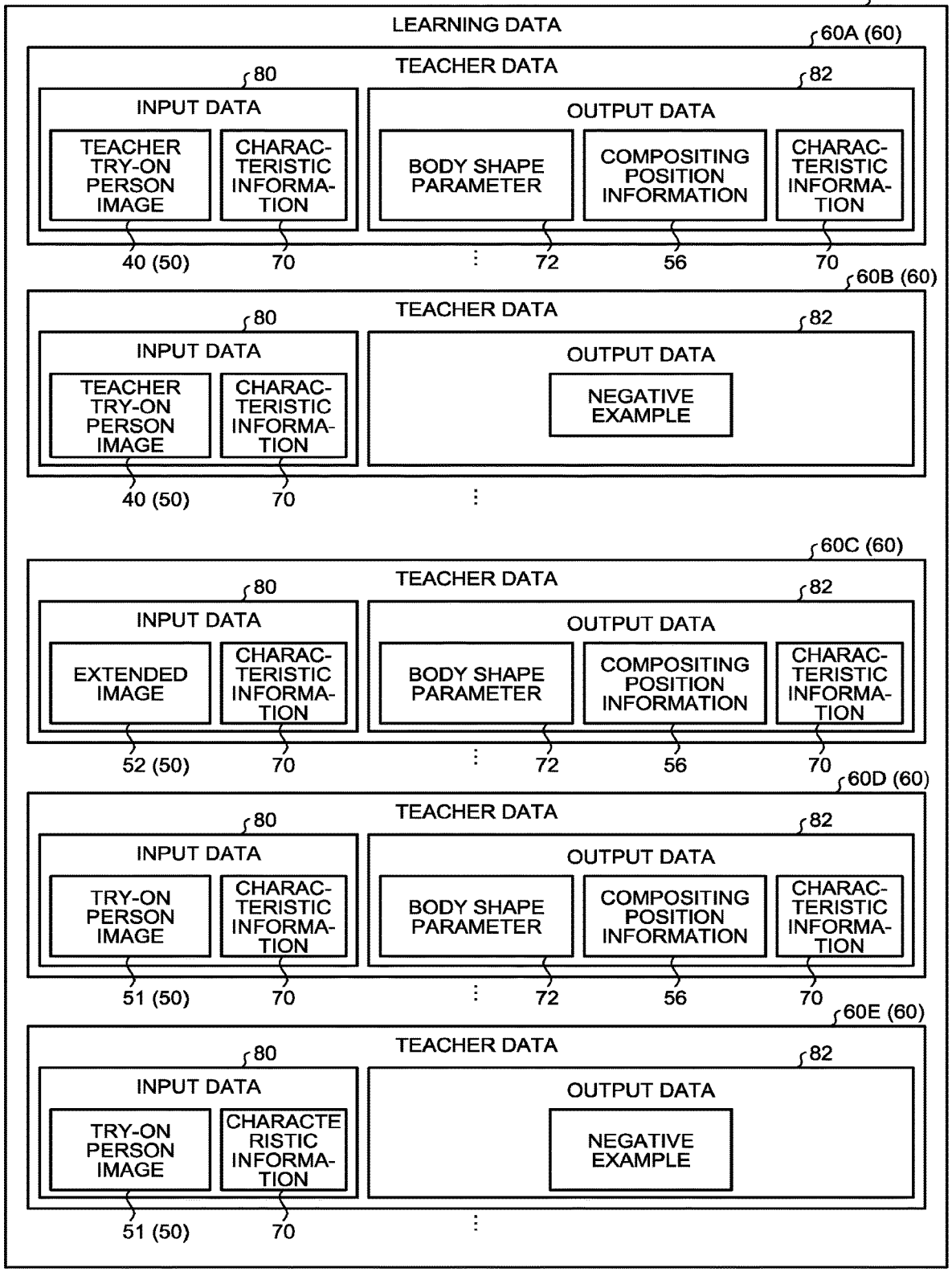
FIG. 4 is a schematic diagram illustrating an example of a data configuration of learning data.

FIG. 4 is a schematic diagram illustrating an example of a data configuration of the learning data 14A.

A plurality of pieces of teacher data 60 are registered in the learning data 14A. The learning data 14A is subjected to processing performed by the learning unit 12C such as registration of a new piece of the teacher data 60, and change or correction of the registered teacher data 60. Accordingly, a plurality of types of teacher data 60 (for example, teacher data 60A to teacher data 60E) are registered in the learning data 14A.

The teacher data 60 includes input data 80 and output data 82 corresponding to the input data 80. The input data 80 is data to be a factor of prediction or determination of the corresponding output data 82. The output data 82 is data indicating an answer derived from the corresponding input data 80.

In the teacher data 60, types of data included in the teacher data 60 and the output data 82 are different depending on the type of the teacher data 60.

First, the following describes the teacher data 60A. The input data 80 of the teacher data 60A includes the teacher try-on person image 40. One piece of the teacher data 60A includes one piece of the input data 80, that is, one piece of the teacher try-on person image 40.

The input data 80 may include characteristic information 70. The characteristic information 70 is information indicating a characteristic of the try-on person. The characteristic information 70 included in the input data 80 is information indicating a characteristic of the try-on person represented by the teacher try-on person image 40 included in the input data 80.

The output data 82 includes a body shape parameter 72 and compositing position information 56.

The body shape parameter 72 is a parameter indicating the body shape of the try-on person represented by the teacher try-on person image 40 included in the corresponding input data 80.

The body shape parameter includes one or a plurality of parameters. Here, the parameter is a measurement value of one or a plurality of points of a human body. The measurement value is not limited to an actually-measured value, but includes a value obtained by estimating the measurement value and a value corresponding to the measurement value.

Specifically, the body shape parameter includes at least one of parameters of a chest measurement, a waist measurement, a hip measurement, a height, and a shoulder width. The parameters included in the body shape parameter are not limited to these parameters. For example, the body shape parameter may further include parameters such as a length of a sleeve and an inseam.

The body shape parameter may be information indicating the body shape itself of the try-on person, or may be information indicating a size of the clothing assuming that the try-on person wears clothing the size of which matches the body shape. In this case, for example, the body shape parameter may include parameters such as a length of a garment, a shoulder width, a width of a garment, and a length of a sleeve. The present embodiment describes a case of using a length of a garment, a shoulder width, a width of a garment, and a length of a sleeve as the body shape parameter. However, the body shape parameter is not limited thereto.

The compositing position information 56 is information indicating a compositing position of the clothing image in the teacher try-on person image 40 included in the corresponding input data 80. The compositing position is used for positioning at the time of compositing the clothing image on a region representing the try-on person included in the teacher try-on person image 40 (hereinafter, referred to as a try-on person region 40A).

The compositing position information 56 may be, for example, information indicating a position of a specific portion of the try-on person (for example, a shoulder portion), or may be information indicating a composite target region of the clothing image in the teacher try-on person image 40. The present embodiment describes a case in which the compositing position information represents the composite target region for the clothing image in the teacher try-on person image 40.

Figure 5:
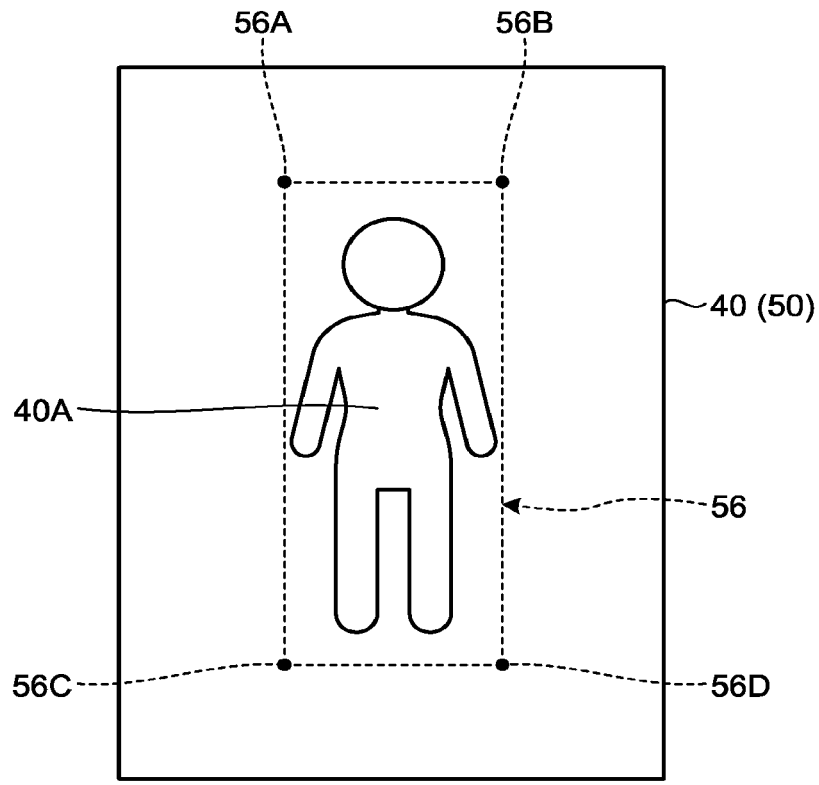
FIG. 5 is an explanatory diagram of an example of compositing position information.

FIG. 5 is an explanatory diagram of an example of the compositing position information 56. For example, the compositing position information 56 is information indicating the composite target region having a rectangular shape surrounding the try-on person region 40A representing the try-on person in the teacher try-on person image 40. The compositing position information 56 may also be information indicating a position of each apex (56A, 56B, 56C, and 56D) of a rectangle surrounding the try-on person region 40A. Alternatively, the compositing position information 56 may be information indicating a position of at least one of these four apexes.

The compositing position information 56 is not limited to the information indicating the composite target region having a rectangular shape. For example, the compositing position information 56 may be information indicating at least part of an external shape of the try-on person region 40A included in the teacher try-on person image 40.

The compositing position information 56 may also be information indicating a specific portion of the try-on person (for example, a shoulder portion) in the teacher try-on person image 40.

Returning to FIG. 4, the description will be continued. The output data 82 may further include the characteristic information 70. That is, at least one of the input data 80 and the output data 82 may further include the characteristic information 70.

The characteristic information 70 included in the output data 82 is characteristic information of the try-on person represented by the teacher try-on person image 40 included in the input data 80 corresponding to the output data 82.

The teacher data 60A to the teacher data 60E will be described later. A plurality of types of the teacher data 60 (the teacher data 60A to the teacher data 60E) are registered and updated as appropriate through the processing performed by the learning unit 12C (details will be described later).

Returning to FIG. 3, the description will be continued. The learning unit 12C includes the model learning unit 12E, the correction unit 12F, the extended image generation unit 12G, the display control unit 12H, the reception unit 12I, and the change unit 12J.

The model learning unit 12E generates and updates the learning data 14A, and generates the learning model.

First, the following describes generation of the learning data 14A by the model learning unit 12E. The model learning unit 12E acquires, from the acquisition unit 12A, the teacher try-on person image 40, the three-dimensional data of the try-on person represented by the teacher try-on person image 40, and the characteristic information 70 of the try-on person. The model learning unit 12E then derives the output data 82 corresponding to the input data 80 including the teacher try-on person image 40 and the characteristic information 70 using the acquired three-dimensional data.

For example, the model learning unit 12E creates in advance a function or a model for deriving the body shape parameter indicated by the three-dimensional data from the three-dimensional data. To create the function or the model for deriving the body shape parameter from the three-dimensional data, a well-known method may be used.

By introducing the three-dimensional data acquired by the acquisition unit 12A into the function or the model, the model learning unit 12E derives the body shape parameter 72.

For example, the model learning unit 12E derives, as the compositing position information 56, a region having a rectangular shape surrounding the try-on person region 40A representing the try-on person in the teacher try-on person image 40 (also refer to FIG. 4). The model learning unit 12E also obtains the characteristic information 70 of the try-on person acquired by the acquisition unit 12A.

The model learning unit 12E then generates, as the output data 82, the body shape parameter 72, the compositing position information 56, and the characteristic information 70 that are derived.

Furthermore, the model learning unit 12E registers, in the learning data 14A, the teacher data 60A including the input data 80 including the teacher try-on person image 40 and the characteristic information 70 acquired from the acquisition unit 12A, and the output data 82 generated by using the input data 80 and the three-dimensional data (the body shape parameter 72, the compositing position information 56, and the characteristic information 70).

The model learning unit 12E generates the teacher data 60A using the method described above every time the acquisition unit 12A acquires the teacher try-on person image 40, the three-dimensional data, and the characteristic information 70. In other words, the model learning unit 12E generates the teacher data 60A every time the photographing unit 20 and the three-dimensional data acquisition unit 21 acquire the teacher try-on person image 40 and the three-dimensional data by photographing. The model learning unit 12E then registers the generated teacher data 60A in the learning data 14A.

Accordingly, the teacher data 60A is generated for each teacher try-on person image 40, and registered in the learning data 14A of the storage unit 14.

Next, the following describes generation of the learning model. The model learning unit 12E learns the learning model by machine learning using the learning data 14A including a plurality of pieces of the teacher data 60. A well-known method may be used for machine learning. For example, the model learning unit 12E learns the learning model by deep learning using an algorithm of a convolutional neural network (CNN), recurrent neural network (RNN), and the like.

The learning unit 12C may correct or change the teacher data 60 registered in the learning data 14A. In this case, the model learning unit 12E may learn the learning model by using the learning data 14A including the teacher data 60 before the correction (for example, the teacher data 60A) and the teacher data 60 after the correction or after the change. The learning unit 12C may also learn the learning model using the teacher data 60 after the correction or after the change.

In the present embodiment, the correction unit 12F of the learning unit 12C corrects the output data 82 corresponding to the input data 80 in accordance with the characteristic information 70 included in the input data 80 of the teacher data 60A.

For example, as the exposure degree from the clothing indicated by the characteristic information 70 is higher, the correction unit 12F so corrects the body shape parameter 72 in the output data 82 corresponding to the input data 80 including the characteristic information 70 as to indicate a smaller-sized body shape. At this point, the correction unit 12F may correct the body shape parameter 72 such that a portion of a human body having a higher exposure degree from the clothing (for example, a back and the like) indicated by the characteristic information 70 illustrates a smaller-sized body shape.

For example, the correction unit 12F determines a volume of hair based on a hairstyle indicated by the characteristic information 70. The correction unit 12F then corrects the body shape parameter 72 in the output data 82 corresponding to the input data 80 including the characteristic information 70 to illustrate a smaller-sized body shape as the volume of hair increases. At this point, the correction unit 12F may also correct the body shape parameter 72 such that a head part of a human body indicated by the characteristic information 70 illustrates a smaller size.

For example, the correction unit 12F may correct the output data 82 in accordance with the nationality indicated by the characteristic information 70. In this case, for example, the correction unit 12F so corrects the body shape parameter 72 in the output data 82 corresponding to the input data 80 including the characteristic information 70 as to illustrate a smaller-sized body shape as the nationality indicated by the characteristic information 70 is information indicating nationality of people wearing a larger quantity of clothes or wearing a larger number of layers of clothes.

For example, the correction unit 12F may correct the output data 82 in accordance with the gender indicated by the characteristic information 70. In this case, for example, in a case in which the gender indicated by the characteristic information 70 is female, the correction unit 12F corrects the body shape parameter 72 in the output data 82 corresponding to the input data 80 including the characteristic information 70 to illustrate a body shape having a smaller size. For example, in a case in which the gender indicated by the characteristic information 70 is male, the correction unit 12F corrects the body shape parameter 72 in the output data 82 corresponding to the input data 80 including the characteristic information 70 to illustrate a body shape having a larger size.

In this way, the correction unit 12F of the learning unit 12C may correct the output data 82 of the teacher data 60A that is created by using the teacher try-on person image 40 and the three-dimensional data obtained from the photographing unit 20 and the three-dimensional data acquisition unit 21.

Furthermore, the learning unit 12C may generate an extended image by extending the teacher try-on person image 40 included in the teacher data 60 registered in the learning data 14A.

In this case, the extended image generation unit 12G of the learning unit 12C generates the extended image. The extended image is an image generated by changing at least part of the teacher try-on person image 40 registered in the learning data 14A. Through the processing performed by the extended image generation unit 12G, a plurality of extended images similar to the teacher try-on person image 40 are generated from one teacher try-on person image 40.

The extended image is, for example, at least one of a clothing superimposed image, a mask image, a cutout image, a processed image, and a changed image.

The clothing superimposed image is an image obtained by superimposing the clothing image 42 on the try-on person region 40A included in the teacher try-on person image 40. For example, the extended image generation unit 12G generates the extended image of the teacher try-on person image 40 by generating the clothing superimposed image by superimposing the clothing image 42 that is determined in advance on the teacher try-on person image 40 registered in the learning data 14A. To generate the clothing superimposed image, a well-known image composition method may be used.

The mask image is an image obtained by masking a partial region of the teacher try-on person image 40. For example, the extended image generation unit 12G generates the extended image of the teacher try-on person image 40 by generating the mask image by changing a color of a partial region of the teacher try-on person image 40 registered in the learning data 14A into a color that is determined in advance such as black or white. To generate the mask image, a well-known image processing method may be used.

The cutout image is an image obtained by cutting out a partial region of the teacher try-on person image 40. For example, the extended image generation unit 12G generates the extended image of the teacher try-on person image 40 by generating the cutout image by cutting out a partial region of the teacher try-on person image 40 registered in the learning data 14A. To generate the cutout image, a well-known image processing method may be used.

The processed image is an image obtained by processing at least a partial region of the teacher try-on person image 40. To process the image, a well-known processing technique may be used to obtain a style of painting such as a sketch image style, a crayon image style, a painting style such as oil painting and a Japanese painting, or a line drawing/drawing image style. To generate the processed image, a well-known image processing method may be used.

The changed image is an image obtained by changing at least a partial region of the teacher try-on person image 40 into another image. For example, the changed image is an image obtained by changing a background region as a region other than the try-on person region 40A included in the teacher try-on person image 40 into another image. To generate the changed image, a well-known image processing method may be used.

The extended image generation unit 12G then registers the generated extended image in the learning data 14A as a new piece of the teacher data 60. Specifically, the extended image generation unit 12G specifies the teacher data 60A including the teacher try-on person image 40 that is used for generating the extended image. The extended image generation unit 12G then uses the characteristic information 70 included in the specified teacher data 60A and the generated extended image as a new piece of the input data 80. The extended image generation unit 12G uses the output data 82 included in the specified teacher data 60A as the output data 82 corresponding to the new piece of the input data 80. Furthermore, the extended image generation unit 12G registers the teacher data 60 including the new piece of the input data 80 and the output data 82 in the learning data 14A to update the learning data 14A.

Accordingly, as illustrated in FIG. 4, the teacher data 60C including the extended image 52 obtained by extending the teacher try-on person image 40 as the input data 80 is registered in the learning data 14A as a new piece of the teacher data 60.

In this case, the model learning unit 12E can learn the learning model by using a plurality of types of the teacher data 60 (including the teacher data 60A and the teacher data 60C) registered in the learning data 14A.

Returning to FIG. 3, the description will be continued. The learning unit 12C may change the output data 82 registered in the learning data 14A in accordance with a change instruction for the output data 82 input by an operation instruction on the input unit 22 made by the user.

In this case, the display control unit 12H of the learning unit 12C displays, on the display unit 18, the superimposed image W obtained by superimposing the clothing image 42 that is shape-modified in accordance with the body shape parameter 72 included in the output data 82 on the compositing position indicated by the compositing position information 56 included in the output data 82 corresponding to the input data 80 including the teacher try-on person image 40 on the teacher try-on person image 40 included in the teacher data 60A.

The clothing image 42 that is shape-modified in accordance with the body shape parameter 72 is obtained by processing of enlarging, reducing, or shape-modifying the clothing image 42 stored in advance to indicate the size of the body shape indicated by the body shape parameter 72. To perform the processing of shape-modifying the clothing image 42, a well-known technique may be used.

Thus, for example, the superimposed image W illustrated in FIG. 2 is displayed on the display unit 18. The user refers to the superimposed image W displayed on the display unit 18, and inputs a change instruction for at least one of the compositing position information 56 and the body shape parameter 72. The change instruction includes, for example, information after changing at least one of a position, a size, and a range of the compositing position information 56, and information after changing the body shape parameter 72. The reception unit 12I of the learning unit 12C then receives the change instruction from the input unit 22 via the acquisition unit 12A.

Returning to FIG. 3, the description will be continued. The change unit 12J of the learning unit 12C changes, into the information after the change indicated by the change instruction received by the reception unit 12I, the output data 82 corresponding to the input data 80 including the teacher try-on person image 40 that is used for the last superimposed image W displayed on the display unit 18 in the teacher data 60A.

In this case, the model learning unit 12E can learn the learning model by using a plurality of types of the teacher data 60 (including the teacher data 60A, the teacher data 60A after the change, and the teacher data 60C) registered in the learning data 14A.

The user who operates the input unit 22 may input a change instruction to change the output data 82 into a negative example. In this case, the reception unit 12I of the learning unit 12C receives the change instruction indicating negative example information from the input unit 22 via the acquisition unit 12A.

The change unit 12J of the learning unit 12C then changes the output data 82 corresponding to the input data 80 including the teacher try-on person image 40 in the learning data 14A into the output data 82 indicating the negative example (refer to the teacher data 60B in FIG. 4). In a case in which the output data 82 represents the negative example, an answer derived from the corresponding input data 80 is the negative example. In this way, the change unit 12J may change the output data 82 into the negative example in accordance with the operation instruction on the input unit 22 made by the user.

In this case, the model learning unit 12E can learn the learning model by using the teacher data 60 (including the teacher data 60A, the teacher data 60A after the change, the teacher data 60B, and the teacher data 60C) registered in the learning data 14A.

As described above, the terminal device 26 generates and displays the virtual try-on image using the learning model generated by the information processing device 10. As described above, the acquisition unit 12A of the information processing device 10 may acquire, from the terminal device 26, the display result information indicating the display result of the virtual try-on image displayed by the terminal device 26.

In this case, the learning unit 12C of the information processing device 10 may register a new piece of the teacher data 60 in the learning data 14A using the display result information acquired from the terminal device 26.

The display result information is information indicating the display result of the virtual try-on image by the terminal device 26. In the present embodiment, the display result information represents first display result information or second display result information.

The first display result information includes positive example information indicating a positive example, the try-on person image 51, and the output data 82. The positive example information included in the first display result information is information indicating that the output data 82 included in the first display result information is the positive example. The try-on person image 51 included in the first display result information is the try-on person image 50 used for the virtual try-on image that is composited and displayed by using the output data 82 included in the first display result information by the terminal device 26.

That is, the first display result information is information including the try-on person image 51 and the output data 82 used for displaying the virtual try-on image by the terminal device 26, and the positive example information indicating that the output data 82 is the positive example.

The second display result information includes the negative example information indicating the negative example, the try-on person image 51, and the output data 82. The negative example information included in the second display result information is information indicating that the output data 82 included in the second display result information is the negative example. The try-on person image 51 included in the second display result information is the try-on person image 50 used for the virtual try-on image that is composited and displayed by using the output data 82 included in the second display result information by the terminal device 26.

That is, the second display result information is information including the try-on person image 51 and the output data 82 used for displaying the virtual try-on image by the terminal device 26, and the negative example information indicating that the output data 82 is the negative example.

In a case in which the acquisition unit 12A acquires the first display result information, the model learning unit 12E of the learning unit 12C registers, in the learning data 14A, a new piece of the teacher data 60 obtained by associating the input data 80 including the try-on person image 51 included in the first display result information with the output data 82 included in the first display result information.

Accordingly, as illustrated in FIG. 4, a new piece of the teacher data 60D obtained by associating the input data 80 including the try-on person image 51 included in the first display result information with the output data 82 included in the first display result information is registered in the learning data 14A. The teacher data 60D is an example of the teacher data 60.

On the other hand, in a case in which the acquisition unit 12A acquires the second display result information, the model learning unit 12E of the learning unit 12C registers, in the learning data 14A, a new piece of the teacher data 60 obtained by associating the input data 80 including the try-on person image 51 included in the second display result information with the output data 82 including the negative example information indicating the negative example.

Accordingly, as illustrated in FIG. 4, a new piece of the teacher data 60E obtained by associating the input data 80 including the try-on person image 51 included in the second display result information with the output data 82 including the negative example information is registered in the learning data 14A. The teacher data 60E is an example of the teacher data 60.

In this case, the model learning unit 12E can learn the learning model by using the teacher data 60 (including the teacher data 60A, the teacher data 60A after the change, the teacher data 60B, the teacher data 60C, the teacher data 60D, and the teacher data 60E) registered in the learning data 14A.

Returning to FIG. 3, the description will be continued. Next, the following describes the deriving unit 12D. When the acquisition unit 12A acquires the try-on person image 51 from the terminal device 26, the deriving unit 12D derives the output data 82 of the try-on person represented by the try-on person image 51 using the try-on person image 51 and the learning model generated by the learning unit 12C.

The deriving unit 12D derives the output data 82 corresponding to the try-on person image 51 by inputting, as the input data 80, the try-on person image 51 acquired from the terminal device 26 to the learning model generated by the learning unit 12C.

The deriving unit 12D then transmits the derived output data 82 to the terminal device 26 via the communication unit 12B. Thus, the information processing device 10 can transmit, to the terminal device 26, the output data 82 (the body shape parameter 72, the compositing position information 56, and the output data 82) for the try-on person image 51 as a virtual try-on target received from the terminal device 26.

Next, the following describes a function of the terminal device 26.

The terminal device 26 includes a photographing unit 26A, an input unit 26B, a display unit 26C, a storage unit 26D, and a control unit 26E. The photographing unit 26A, the input unit 26B, the display unit 26C, 26D, and the control unit 26E are connected to each other to be able to exchange data and signals. The storage unit 26D stores various kinds of data.

The control unit 26E includes a communication unit 26F, an acquisition unit 26G, a generation unit 26H, a display control unit 26I, and a reception unit 26J. Some of or all of the control unit 26E, the communication unit 26F, the acquisition unit 26G, the generation unit 26H, the display control unit 26I, and the reception unit 26J may be implemented by causing a processing device such as a CPU to execute a computer program, that is, by software, may be implemented by hardware such as an IC, or may be implemented by using both of software and hardware, for example.

The communication unit 26F communicates with the information processing device 10 and the external server 28 via the communication line 34.

The display control unit 26I generates various images on the display unit 26C. The reception unit 26J receives, from the input unit 26B, various kinds of information input by an operation instruction on the input unit 26B made by the user. The acquisition unit 26G acquires the output data 82 from the information processing device 10 via the communication unit 26F and the communication line 34.

The generation unit 26H generates a virtual try-on image by compositing the try-on person image 51 and the clothing image 42.

For example, it is assumed that the clothing ID of the clothing image 42 as the virtual try-on target is input by an operation instruction on the input unit 26B made by the user. For example, the generation unit 26H transmits a request for viewing the clothing DB 14B to the information processing device 10 via the communication unit 26F. The generation unit 26H then receives the clothing DB 14B from the information processing device 10 via the acquisition unit 26G and the communication unit 26F. The display control unit 26I then displays a list of clothing images indicated by the received clothing DB 14B on the display unit 26C.

The user selects a clothing image as a try-on target by operating the input unit 26B while referring to the list of clothing images displayed on the display unit 26C. The reception unit 26J then receives the clothing ID of the selected clothing image from the input unit 26B. The generation unit 26H then transmits the received clothing ID to the information processing device 10 via the communication unit 26F.

The communication unit 12B of the information processing device 10 reads, from the clothing DB 14B, the clothing image 42 corresponding to the clothing ID received from the terminal device 26 to be transmitted to the terminal device 26. Through this processing, the generation unit 26H of the terminal device 26 acquires the clothing image 42 selected by the user from the information processing device 10 via the acquisition unit 26G and the communication unit 26F.

The generation unit 26H also acquires the try-on person image 51 from the photographing unit 26A via the acquisition unit 26G. For example, the user inputs a photographing instruction for the photographing unit 26A by operating the input unit 26B. The photographing unit 26A then acquires the try-on person image 51 by photographing to be output to the control unit 26E.

The generation unit 26H of the control unit 26E acquires the try-on person image 51 as the virtual try-on target from the photographing unit 26A via the acquisition unit 26G. The generation unit 26H may also acquire the try-on person image 51 from the storage unit 26D.

There may be a case in which the try-on person image 51 acquired from the photographing unit 26A or the storage unit 26D is an image not including a clothing wearing region.

The clothing wearing region represents a target region of the try-on person at which the clothing image 42 as the virtual try-on target is worn. For example, in a case in which the clothing image 42 is a hat, the clothing wearing region is a head part of the try-on person. In a case in which the clothing image 42 is an upper garment, the clothing wearing region is an upper body of the try-on person.

In this case, the generation unit 26H complements the try-on person image 51 so that the acquired try-on person image 51 becomes an image including the clothing wearing region. The generation unit 26H may also complement the acquired try-on person image 51 to be an image including the clothing wearing region by changing a photographing angle of the try-on person represented by the try-on person image 51. The generation unit 26H may employ the complemented try-on person image 51 as the try-on person image 51 used for virtual try-on.

For the complement, a well-known method may be used. For example, the generation unit 26H prepares a human body image having a standard human body shape in advance. The generation unit 26H may use, as the complemented try-on person image 51, a composite image obtained by superimposing the try-on person image 51 as an image not including the clothing wearing region on the human body image.

Next, the generation unit 26H transmits the try-on person image 51 used for virtual try-on to the information processing device 10 via the communication unit 26F. As described above, the deriving unit 12D of the information processing device 10 then derives the output data 82 of the try-on person represented by the try-on person image 51 using the try-on person image 51 acquired from the terminal device 26 and the learning model generated by the learning unit 12C.

The communication unit 12B of the information processing device 10 transmits the output data 82 derived by the deriving unit 12D to the terminal device 26.

Accordingly, the generation unit 26H of the terminal device 26 acquires the output data 82 from the information processing device 10 via the communication unit 26F. In other words, the generation unit 26H acquires the output data 82 of the try-on person represented by the try-on person image 51 that is derived by using the try-on person image 51 as the virtual try-on target and the learning model.

The generation unit 26H then generates the virtual try-on image obtained by compositing the try-on person image 51 and the clothing image 42 using the try-on person image 51 as the virtual try-on target and the output data 82 of the try-on person represented by the try-on person image 51 that is acquired from the information processing device 10.

Specifically, the generation unit 26H generates the virtual try-on image obtained by compositing the clothing image 42 that is shape-modified in accordance with the body shape parameter 72 included in the output data 82 at the compositing position indicated by the compositing position information 56 included in the output data 82 that is derived by using the learning model in the try-on person image 51.

The generation unit 26H may generate the virtual try-on image similarly to generation of the superimposed image W performed by the learning unit 12C of the information processing device 10. That is, the generation unit 26H enlarges, reduces, or shape-modifies the clothing image 42 as the virtual try-on target instructed by the user who operates the terminal device 26 to indicate the size of the body shape indicated by the body shape parameter 72 included in the derived output data 82. For this processing, a well-known technique may be used.

The generation unit 26H then generates the virtual try-on image by compositing the shape-modified clothing image 42 at the compositing position indicated by the compositing position information 56 included in the derived output data 82. To perform compositing at the compositing position indicated by the compositing position information 56, a well-known method may be used.

The display control unit 26I displays the virtual try-on image generated by the generation unit 26H on the display unit 26C.

Figure 6:
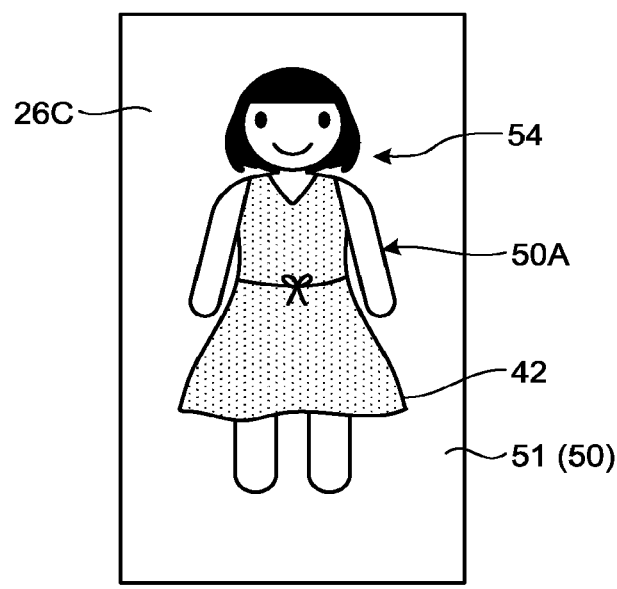
FIG. 6 is a schematic diagram illustrating an example of a virtual try-on image.

FIG. 6 is a schematic diagram illustrating an example of a virtual try-on image 54 displayed on the display unit 26C of the terminal device 26. As illustrated in FIG. 6, the virtual try-on image 54 is displayed on the display unit 26C.

As described above, the virtual try-on image 54 is the virtual try-on image 54 generated by the generation unit 26H. Accordingly, on the display unit 26C, displayed is the virtual try-on image 54 obtained by compositing the clothing image 42 that is shape-modified to have a body shape indicated by the body shape parameter 72 included in the output data 82 at the compositing position indicated by the compositing position information 56 included in the output data 82 that is derived by using the learning model. That is, on the display unit 26C, the clothing image 42 that is enlarged, reduced, or shape-modified to match the body shape of the try-on person with high accuracy is superimposed on a try-on person region 50A of the virtual try-on image 54 to be displayed.

Accordingly, the virtual try-on system 1 can easily provide, to the user, the virtual try-on image 54 that is composited with high accuracy. Specifically, the virtual try-on system 1 can easily provide the virtual try-on image 54 that is positioned with high accuracy and is corrected to match the body shape with high accuracy.

Next, the following describes a procedure of virtual try-on processing performed by the virtual try-on system 1.

Figure 7:
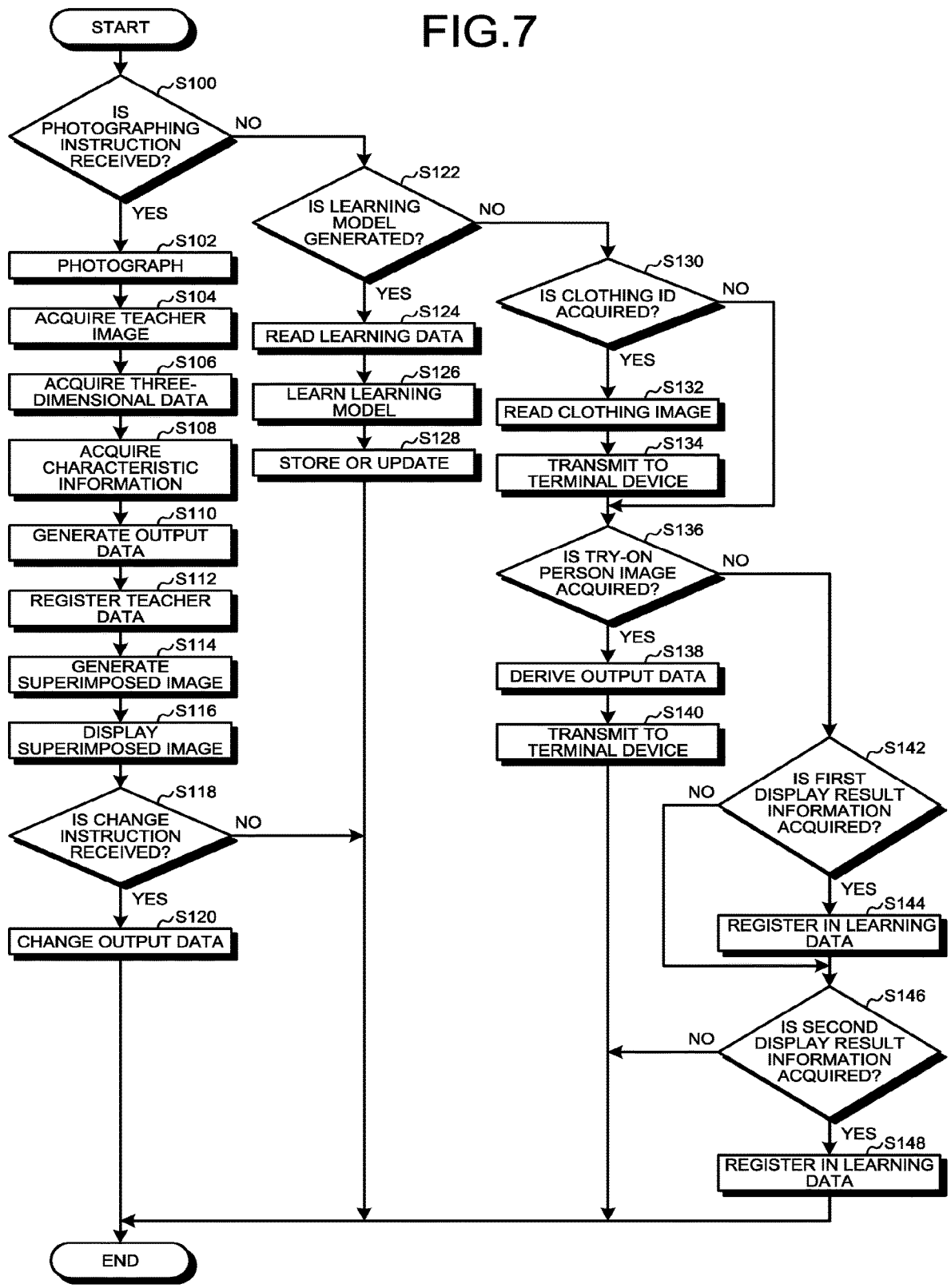
FIG. 7 is a flowchart illustrating an example of a procedure of information processing.

FIG. 7 is a flowchart illustrating an example of a procedure of information processing performed by the information processing device 10.

First, the acquisition unit 12A determines whether a photographing instruction is received from the input unit 22 (Step S100). For example, at the time of registering the teacher data 60A in the information processing device 10, the user facing the front of the display unit 18 operates the input unit 22 to input the photographing instruction. Accordingly, the acquisition unit 12A receives the photographing instruction from the input unit 22.

If positive determination is made at Step S100 (Yes at Step S100), the process proceeds to Step S102. At Step S102, the photographing unit 20 and the three-dimensional data acquisition unit 21 photograph the try-on person, and obtains the teacher try-on person image 40 of the try-on person and the three-dimensional data of the try-on person. The acquisition unit 12A then acquires the teacher try-on person image 40 from the photographing unit 20 (Step S104). The acquisition unit 12A also acquires the three-dimensional data from the three-dimensional data acquisition unit 21 (Step S106).

Next, the acquisition unit 12A acquires the characteristic information 70 from the input unit 22 (Step S108). For example, the try-on person facing the front of the display unit 18 operates the input unit 22 to input the characteristic information 70. The input unit 22 then acquires the characteristic information 70 of the try-on person represented by the teacher try-on person image 40 acquired at Step S104.

Next, the model learning unit 12E of the learning unit 12C generates the output data 82 for the teacher data 60A using the teacher try-on person image 40, the three-dimensional data, and the characteristic information 70 that are acquired at Step S104 to Step S108 (Step S110).

Specifically, the model learning unit 12E derives the body shape parameter 72 by introducing the three-dimensional data acquired at Step S106 into a function or a model generated in advance. For example, the model learning unit 12E derives, as the compositing position information 56, a region having a rectangular shape surrounding the try-on person region 40A representing the try-on person in the teacher try-on person image 40 acquired at Step S104 (also refer to FIG. 4).

The model learning unit 12E then generates, as the output data 82, the derived body shape parameter 72 and compositing position information 56, and the characteristic information 70 acquired at Step S108.

Next, the model learning unit 12E registers, in the learning data 14A, the teacher data 60A including the input data 80 that includes the teacher try-on person image 40 and the characteristic information 70 acquired at Step S104 and Step S108, and the output data 82 (the body shape parameter 72, the compositing position information 56, and the characteristic information 70) that is generated by using the input data 80 and the three-dimensional data (Step S112).

Next, the display control unit 12H generates the superimposed image W using the teacher data 60A registered at Step S112 (Step S114). At Step S114, the display control unit 12H generates the superimposed image W obtained by superimposing the clothing image 42 that is shape-modified in accordance with the body shape parameter 72 included in the output data 82 on the compositing position indicated by the compositing position information 56 included in the output data 82 included in the teacher data 60A on the teacher try-on person image 40 included in the teacher data 60A. The display control unit 12H then displays the superimposed image W generated at Step S114 on the display unit 18 (Step S116).

Through the processing at Step S114 and Step S116, it is possible to provide the superimposed image W that is composited to match movement or a posture of the try-on person at the time of generating the teacher data 60.

Next, the change unit 12J determines whether a change instruction is received from the input unit 22 via the acquisition unit 12A (Step S118). If negative determination is made at Step S118 (No at Step S118), this routine is ended. If positive determination is made at Step S118 (Yes at Step S118), the process proceeds to Step S120.

At Step S120, the change unit 12J changes the output data 82 included in the teacher data 60A registered at Step S112 into information after the change indicated by the change instruction received at Step S118 (Step S120). Through the processing at Step S120, at least part of the information of the output data 82 included in the teacher data 60A is changed into change content instructed by the user. This routine is then ended.

On the other hand, if negative determination is made at Step S100 described above (No at Step S100), the process proceeds to Step S122. At Step S122, the model learning unit 12E determines whether to generate the learning model (Step S122). For example, the model learning unit 12E determines to generate the learning model in a case in which the learning data 14A is updated. "The learning data 14A is updated" means a case in which at least part of the teacher data 60 registered in the learning data 14A is changed, or a case in which a new piece of the teacher data 60 is registered in the learning data 14A.

If positive determination is made at Step S122 (Yes at Step S122), the process proceeds to Step S124. At Step S124, the model learning unit 12E reads the learning data 14A stored in the storage unit 14 (Step S124).

Next, the model learning unit 12E learns the learning model by machine learning using the learning data 14A read at Step S124 (Step S126). The model learning unit 12E then stores the learning model learned at Step S126 in the storage unit 14 (Step S128). There may be a case in which a learning model has been already stored in the storage unit 14. In this case, the model learning unit 12E may delete the learning model that has been already stored from the storage unit 14, and store the latest learning model that has been learned in the storage unit 14. This routine is then ended.

On the other hand, if negative determination is made at Step S122 described above (No at Step S122), the process proceeds to Step S130.

At Step S130, the communication unit 12B determines whether the clothing ID is acquired from the terminal device (Step S130). If negative determination is made at Step S130 (No at Step S130), the process proceeds to Step S136 described later. If positive determination is made at Step S130 (Yes at Step S130), the process proceeds to Step S132. At Step S132, the communication unit 12B reads the clothing image 42 corresponding to the clothing ID acquired at Step S130 from the clothing DB 14B (Step S132). The communication unit 12B then transmits the clothing image 42 read at Step S132 to the terminal device 26 as an acquisition source of the clothing ID (Step S134).

Next, the deriving unit 12D determines whether the try-on person image 51 is acquired from the terminal device 26 via the communication unit 12B (Step S136). If positive determination is made at Step S136 (Yes at Step S136), the process proceeds to Step S138.

At Step S138, the output data 82 is derived by introducing the try-on person image 51 acquired at Step S136 into the learning model stored in the storage unit 14 (Step S138).

Next, the deriving unit 12D transmits the output data 82 derived at Step S138 to the terminal device 26 as a transmission source of the try-on person image 51 acquired at Step S136 via the communication unit 12B (Step S140). This routine is then ended.

If negative determination is made at Step S136 described above (No at Step S136), the process proceeds to Step S142. At Step S142, the model learning unit 12E determines whether the first display result information is acquired from the terminal device 26 via the acquisition unit 12A (Step S142). If negative determination is made at Step S142 (No at Step S142), the process proceeds to Step S146 described later. If positive determination is made at Step S142 (Yes at Step S142), the process proceeds to Step S144.

At Step S144, the model learning unit 12E registers, in the learning data 14A, the input data 80 including the try-on person image 51 included in the first display result information acquired at Step S142, the output data 82 included in the first display result information, and the teacher data 60D (Step S144).

Next, the model learning unit 12E determines whether the second display result information is acquired from the terminal device 26 via the acquisition unit 12A (Step S146). If negative determination is made at Step S146 (No at Step S146), this routine is ended. If positive determination is made at Step S146 (Yes at Step S146), the process proceeds to Step S148. At Step S148, the model learning unit 12E registers, in the learning data 14A, a new piece of the teacher data 60E obtained by associating the input data 80 including the try-on person image 51 included in the second display result information acquired at Step S146 with the output data 82 including the negative example information indicating the negative example (Step S148). This routine is then ended.

Figure 8:
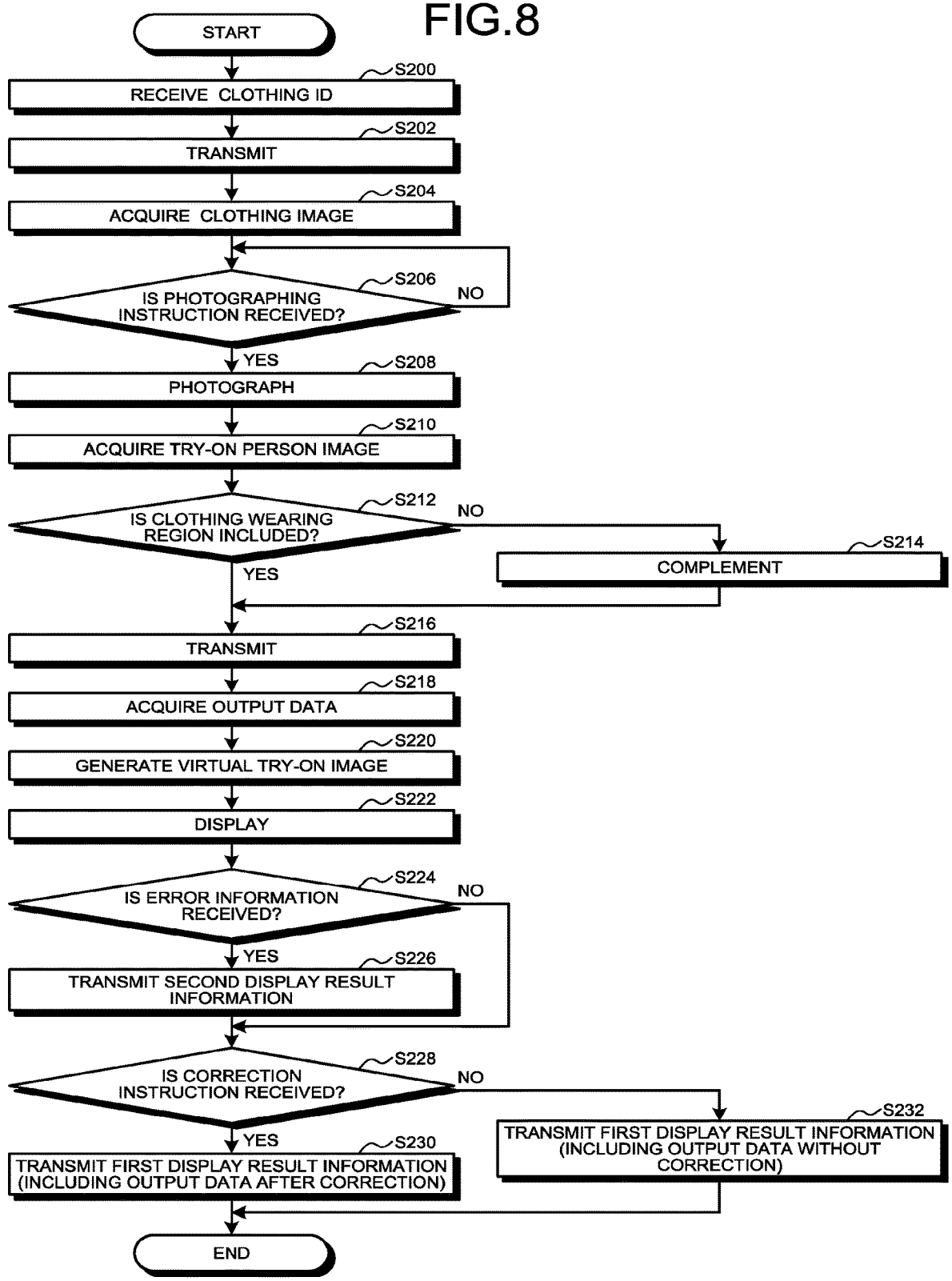
FIG. 8 is a flowchart illustrating an example of a procedure of information processing.

Next, the following describes an example of a procedure of information processing performed by the terminal device 26. FIG. 8 is a flowchart illustrating an example of the procedure of the information processing performed by the terminal device 26.

First, the reception unit 26J receives the clothing ID of the clothing image 42 as the virtual try-on target from the input unit 26B (Step S200). The generation unit 26H then transmits the clothing ID received at Step S200 to the information processing device 10 via the communication unit 26F (Step S202). The generation unit 26H acquires the clothing image 42 corresponding to the clothing ID transmitted at Step S200 from the information processing device 10 (Step S204).

Next, the reception unit 26J repeats negative determination (No at Step S206) until it is determined that the photographing instruction is received from the input unit 26B (Yes at Step S206). If it is determined that the photographing instruction is received (Yes at Step S206), the process proceeds to Step S208.

At Step S208, the photographing unit 26A photographs the try-on person, and obtains the try-on person image 51 (Step S208). The acquisition unit 26G then acquires the try-on person image 51 from the photographing unit 26A (Step S210).

Next, the generation unit 26H determines whether the try-on person image 51 acquired at Step S210 includes the clothing wearing region for the clothing image 42 acquired at Step S204 (Step S212).

If it is determined that the clothing wearing region is not included (No at Step S212), the process proceeds to Step S214. At Step S214, the generation unit 26H complements the try-on person image 51 acquired at Step S210 to be an image including the clothing wearing region for the clothing image 42 acquired at Step S204 (Step S214). In this case, the generation unit 26H employs the complemented try-on person image 51 as the try-on person image 51 used for virtual try-on.

Next, the generation unit 26H transmits the try-on person image 51 acquired at Step S210 or the try-on person image 51 complemented at Step S214 to the information processing device 10 via the communication unit 26F (Step S216). As described above, the deriving unit 12D of the information processing device 10 then derives the output data 82 of the try-on person represented by the try-on person image 51 using the try-on person image 51 acquired from the terminal device 26 and the learning model generated by the learning unit 12C, and transmits the output data 82 to the terminal device 26.

As such, the generation unit 26H of the terminal device 26 acquires the output data 82 from the information processing device 10 via the communication unit 26F (Step S218). In other words, the generation unit 26H acquires the output data 82 of the try-on person represented by the try-on person image 51 that is derived by using the try-on person image 51 as the virtual try-on target and the learning model.

The generation unit 26H then generates the virtual try-on image 54 by compositing the try-on person image 51 and the clothing image 42 by using the try-on person image 51 as the virtual try-on target transmitted to the information processing device 10 at Step S216 and the output data 82 of the try-on person represented by the try-on person image 51 that is acquired from the information processing device 10 (Step S220).

Next, the display control unit 26I displays the virtual try-on image 54 generated at Step S220 on the display unit 26C (Step S222). Accordingly, the virtual try-on image 54 with high accuracy is displayed on the display unit 26C of the terminal device 26.

Next, the reception unit 26J determines whether error information is received from the input unit 26B (Step S224).

There may be a case in which the user who operates the terminal device 26 feels a sense of incongruity for the virtual try-on image 54 displayed on the display unit 26C. For example, there may be a case in which a positional relation between the try-on person image 51 and the clothing image 42, the size of the displayed clothing image 42, and the like in the virtual try-on image 54 are different from those imagined by the user. In such a case, the user operates the input unit 26B to input error information for causing the output data 82 used for generating the virtual try-on image 54 to be the negative example. The reception unit 26J then receives the error information from the input unit 22 (Yes at Step S224).

If positive determination is made at Step S224 (Yes at Step S224), the process proceeds to Step S226. At Step S226, the reception unit 26J includes the negative example information indicating the negative example, the try-on person image 51 acquired at Step S210, and the output data 82 acquired at Step S218. The second display result information is transmitted to the information processing device 10 via the communication unit 26F (Step S226). The process then proceeds to Step S228. If negative determination is made at Step S224 (No at Step S224), the process proceeds to Step S228.

At Step S228, the reception unit 26J determines whether a correction instruction is received from the input unit 22 (Step S228).

For example, there may be a case in which the user who operates the terminal device 26 desires to correct the compositing position of the clothing image 42, or correct the size of the clothing image 42 for the virtual try-on image 54 displayed on the display unit 26C. In such a case, the user operates the input unit 22 to input the correction instruction for at least one of the body shape parameter 72 and the compositing position information 56. There may also be a case in which the user who operates the terminal device 26 does not desire to make a change such as correction for the virtual try-on image 54 displayed on the display unit 26C. In such a case, the user operates the input unit 22 to input an instruction indicating no correction.

At Step S228, the reception unit 26J then determines whether the correction instruction is received from the input unit 22. If the reception unit 26J receives the correction instruction from the input unit 22 (Yes at Step S228), the process proceeds to Step S230.

At Step S230, the reception unit 26J transmits, to the information processing device 10 via the communication unit 26F, the first display result information including the positive example information indicating the positive example, the try-on person image 51, and the output data 82 corrected to be correction content indicated by the correction instruction received at Step S228 (Step S230). This try-on person image 51 is the try-on person image 51 that is used for the virtual try-on image 54 displayed on the display unit 26C at Step S222. This routine is then ended.

On the other hand, if the reception unit 26J receives the instruction indicating no correction from the input unit 26B (No at Step S228), the process proceeds to Step S232. At Step S232, the reception unit 26J transmits, to the information processing device 10 via the communication unit 26F, the first display result information including the positive example information indicating the positive example, the try-on person image 51, and the output data 82 acquired at Step S218 (Step S232). This try-on person image 51 is the try-on person image 51 that is used for the virtual try-on image 54 displayed on the display unit 26C at Step S222. This routine is then ended.

As described above, the virtual try-on system 1 according to the present embodiment includes the learning unit 12C, the acquisition unit 12A, the deriving unit 12D, and the generation unit 26H. The learning unit 12C learns the learning model using the teacher try-on person image 40 as the input data 80, and using the body shape parameter 72 indicating the body shape of the try-on person represented by the teacher try-on person image 40 and the compositing position information 56 of the clothing image 42 in the teacher try-on person image 40 as the output data 82 by machine learning using the three-dimensional data of the try-on person. The acquisition unit 26G acquires the try-on person image 51. The deriving unit 12D derives the output data 82 of the try-on person represented by the try-on person image 51 using the try-on person image 51 and the learning model. The generation unit 26H generates the virtual try-on image 54 by compositing the try-on person image 51 and the clothing image 42 using the derived output data 82.

In this way, the virtual try-on system 1 according to the present embodiment derives the output data 82 (the body shape parameter 72 and the compositing position information 56) of the try-on person represented by the try-on person image 51 by using the learning model learned by machine learning using the three-dimensional data of the try-on person. The derived output data 82 is then used to generate the virtual try-on image 54 by compositing the try-on person image 51 and the clothing image 42.

Accordingly, the virtual try-on system 1 according to the present embodiment is not required to acquire information about the three-dimensional shape of the try-on person at the time of displaying the virtual try-on image 54, and can generate the virtual try-on image 54 by compositing the try-on person image 51 and the clothing image 42 by using the body shape parameter 72 and the compositing position information 56 that are derived by using the learning model.

Thus, the virtual try-on system 1 according to the present embodiment can easily provide the virtual try-on image 54 that is composited with high accuracy.

Modification The embodiment described above describes a case in which the information processing device 10 includes the learning unit 12C and the deriving unit 12D, and the terminal device 26 includes the generation unit 26H by way of example. However, the information processing device 10 may have a configuration further including at least one of the acquisition unit 26G, the generation unit 26H, the reception unit 26J, and the display control unit 26I. Alternatively, the terminal device 26 may have a configuration further including at least one of the acquisition unit 12A, the learning unit 12C, and the deriving unit 12D.

In this case, with one information processing device 10 or one terminal device 26, it is possible to generate the learning data 14A, learn the learning model, derive the output data 82 of the try-on person represented by the try-on person image 51, and generate and display the virtual try-on image 54.

Figure 9:
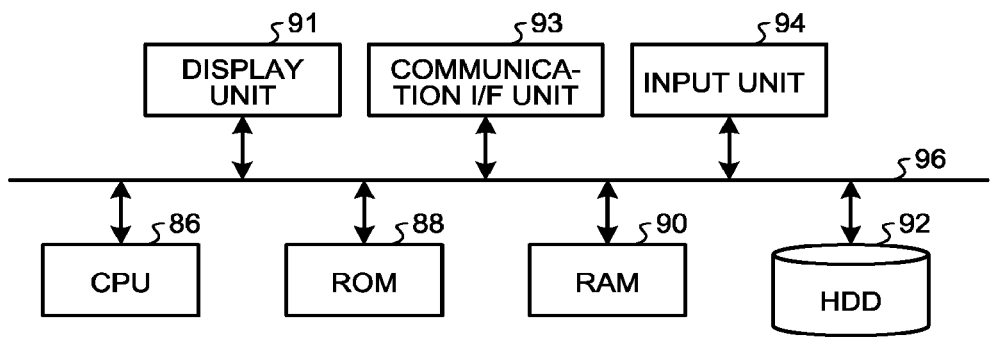
FIG. 9 is a block diagram illustrating a hardware configuration example of the information processing device, the terminal device, and an external server.

Next, the following describes a hardware configuration of the information processing device 10, the terminal device 26, and the external server 28 according to the present embodiment. FIG. 9 is a block diagram illustrating a hardware configuration example of the information processing device 10, the terminal device 26, and the external server 28 according to the present embodiment.

The information processing device 10, the terminal device 26, and the external server 28 according to the present embodiment have a hardware configuration utilizing a normal computer in which a display unit 91, a communication I/F unit 93, an input unit 94, a CPU 86, a read only memory (ROM) 88, a random access memory (RAM) 90, an HDD 92, and the like are connected to each other via a bus 96.

The CPU 86 is an arithmetic unit that controls processing performed by each of the information processing device 10, the terminal device 26, and the external server 28 according to the present embodiment. The RAM 90 stores data required for various kinds of processing performed by the CPU 86. The ROM 88 stores a computer program and the like for implementing various kinds of processing performed by the CPU 86. The HDD 92 stores data to be stored in the storage unit 14 and the storage unit 26D described above. The communication I/F unit 93 is an interface connected to an external device or an external terminal via a communication line and the like for transmitting/receiving data to/from the connected external device or external terminal. The display unit 91 corresponds to each of the display unit 18 and the display unit 26C described above. The input unit 94 receives an operation instruction from the user. The input unit 94 corresponds to the input unit 22 and the input unit 26B described above.

A computer program for executing the various kinds of processing performed by the information processing device 10, the terminal device 26, and the external server 28 according to the present embodiment is embedded and provided in the ROM 88 and the like.

The computer program executed by the information processing device 10, the terminal device 26, and the external server 28 according to the present embodiment may be configured to be recorded and provided in a computer-readable recording medium such as a compact disc read only memory (CD-ROM), a flexible disk (FD), a compact disc recordable (CD-R), and a digital versatile disc (DVD), as an installable or executable file for these devices.

The computer program executed by the information processing device 10, the terminal device 26, and the external server 28 according to the present embodiment may be configured to be stored in a computer connected to a network such as the Internet and provided by being downloaded via the network. Furthermore, the computer program for executing pieces of the processing performed by the information processing device 10, the terminal device 26, and the external server 28 according to the present embodiment may be configured to be provided or distributed via a network such as the Internet.

In the computer program for executing pieces of the processing performed by the information processing device 10, the terminal device 26, and the external server 28 according to the present embodiment, the respective parts described above are generated on a main storage device.

The various kinds of information stored in the HDD 92 may also be stored in an external device. In this case, the external device and the CPU 86 may be configured to be connected via a network and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A virtual try-on system comprising:
   a photographing unit configured to photograph a try-on person image;
   one or more hardware processors configured to function as:
      a first acquisition unit configured to acquire the try-on person image photographed by the photographing unit;
      a second acquisition unit configured to perform photographing and configured to acquire three-dimensional data of a try-on person by the photographing;
      a learning unit configured to learn, by machine learning using the three-dimensional data of the try-on person acquired by the second acquisition unit, a learning model using the try-on person image acquired by the first acquisition unit as input data of a teacher try-on person image, and using a body shape parameter indicating a body shape of the try-on person represented by the teacher try-on person image and compositing position information indicating a compositing position of a clothing image in the teacher try-on person image as output data;
      a deriving unit configured to derive the output data of-including the compositing position information and the body shape parameter corresponding to the try-on person represented by the try-on person image using the try-on person image and the learning model; and
      a generation unit configured to generate a virtual try-on image by compositing the try-on person image and the clothing image using the derived output data, wherein
   the photographing unit and the second acquisition unit are controlled to perform photographing in synchronization with each other to acquire the try-on person image by the first acquisition unit and acquire the three-dimensional data by the second acquisition unit.

2. The virtual try-on system according to claim 1, wherein the generation unit generates the virtual try-on image by compositing the clothing image that is shape-modified in accordance with the body shape parameter included in the output data at a compositing position indicated by the compositing position information included in the derived output data in the try-on person image.

3. The virtual try-on system according to claim 1, wherein
   the learning unit learns the learning model including characteristic information of the try-on person in at least one of the input data and the output data, and
   the characteristic information included in the output data is characteristic information of the try-on person represented by the teacher try-on person image included in the input data corresponding to the output data.

4. The virtual try-on system according to claim 3, wherein the characteristic information represents at least one of an appearance characteristic and an inner characteristic of the try-on person.

5. The virtual try-on system according to claim 3, wherein the characteristic information represents at least one of a color of skin, an exposure degree from clothing, a hairstyle, nationality, a dominant hand, personality, and a recommended photographing direction of the try-on person.

6. The virtual try-on system according to claim 1, wherein the learning unit
   comprises an extended image generation unit configured to generate an extended image by extending the teacher try-on person image, and
   learns the learning model by using the input data including the teacher try-on person image and the input data including the extended image.

7. The virtual try-on system according to claim 6, wherein the extended image generation unit generates, as the extended image, at least one of a clothing superimposed image obtained by superimposing a clothing image on a try-on person region included in the teacher try-on person image, a mask image obtained by masking a partial region of the teacher try-on person image, a cutout image obtained by cutting out a partial region of the teacher try-on person image, and a processed image obtained by processing at least a partial region of the teacher try-on person image.

8. The virtual try-on system according to claim 1, wherein the input data includes a plurality of the teacher try-on person images that are different in at least one of a photographing time, a photographing angle, a type of a photographing unit used for photographing, and a pose of the try-on person at a time of photographing.

9. The virtual try-on system according to claim 1, wherein the learning unit learns the learning model by machine learning using learning data including a plurality of pieces of teacher data in which the input data including the teacher try-on person image is associated with the output data corresponding to the teacher try-on person image that is derived based on the three-dimensional data of the try-on person represented by the teacher try-on person image.

10. The virtual try-on system according to claim 9, wherein
   the input data includes characteristic information of the try-on person, and
   the learning unit comprises a correction unit configured to correct the output data derived from the three-dimensional data in the learning data in accordance with the characteristic information included in the input data.

11. The virtual try-on system according to claim 9, wherein
   the learning unit comprises:
      a display control unit configured to display, on a display unit, a superimposed image obtained by superimposing a clothing image that is shape-modified in accordance with the body shape parameter included in the output data on a compositing position indicated by the compositing position information included in the output data corresponding to the input data including the teacher try-on person image in the learning data on the teacher try-on person image;

a reception unit configured to receive a change instruction for the output data corresponding to the teacher try-on person image included in the displayed superimposed image in the learning data; and a change unit configured to change the output data corresponding to the input data including the teacher try-on person image in the learning data into the output data indicated by the change instruction.

12. The virtual try-on system according to claim 9, wherein the first acquisition unit, in acquiring the try-on person image photographed by the photographing unit:

is configured to acquire, in a case of a positive example, first display result information including positive example information indicating the positive example, the try-on person image, and the output data, and is further configured to acquire, in a case of a negative example, second display result information including negative example information indicating the negative example and the try-on person image, and the learning unit:

registers, in the learning data, a new piece of the teacher data obtained by associating the input data including the try-on person image included in the first display result information with the output data included in the first display result information in a case of acquiring the first display result information, and registers, in the learning data, the input data including the try-on person image included in the second display result information and the output data indicating the negative example, as a new piece of the teacher data, in a case of acquiring the second display result information.

13. The virtual try-on system according to claim 1, wherein the compositing position information is information indicating a composite target area of (1) a rectangular shape surrounding a try-on person region, or (2) a position of each apex of a rectangle surrounding the try-on person region, or (3) information indicating at least part of an external shape of the try-on person region, or (4) information indicating a specific portion of the try-on person in the teacher try-on person image.

14. A virtual try-on method implemented by a computer, the method comprising:

photographing, by a photographing unit, a try-on person image;

acquiring, by a first acquisition unit of the computer, the try-on person image photographed by the photographing unit;

acquiring, by a second acquisition unit of the computer configured to perform further photographing, three-dimensional data of a try-on person by the further photographing;

learning, by machine learning using the three-dimensional data of the try-on person acquired by the second acquisition unit, a learning model using the try-on person image acquired by the first acquisition unit as input data of a teacher try-on person image, and using a body shape parameter indicating a body shape of the try-on person represented by the teacher try-on person image and compositing position information indicating a compositing position of a clothing image in the teacher try-on person image as output data;

deriving the output data including the compositing position information and the body shape parameter corresponding to the try-on person represented by the try-on person image using the try-on person image and the learning model; and generating a virtual try-on image by compositing the try-on person image and the clothing image using the derived output data, wherein the photographing unit and the second acquisition unit are controlled to perform photographing in synchronization with each other to acquire the try-on person image by the first acquisition unit and acquire the three-dimensional data by the second acquisition unit.

15. The virtual try-on method according to claim 14, wherein the compositing position information is information indicating a composite target area of (1) a rectangular shape surrounding a try-on person region, or (2) a position of each apex of a rectangle surrounding the try-on person region, or (3) information indicating at least part of an external shape of the try-on person region, or (4) information indicating a specific portion of the try-on person in the teacher try-on person image.

16. A virtual try-on computer program product having a non-transitory computer readable medium including instructions stored thereon, and operating with a photographing unit configured to photograph a try-on person image, wherein the instructions, when executed by a computer, cause the computer to perform:

acquiring, by a first acquisition unit of the computer, the try-on person image photographed by the photographing unit;

acquiring, by a second acquisition unit of the computer configured to perform further photographing, three-dimensional data of a try-on person by the further photographing;

learning, by machine learning using three-dimensional data of a try-on person, a learning model using the try-on person image acquired by the first acquisition unit as input data of a teacher try-on person image, and using a body shape parameter indicating a body shape of the try-on person represented by the teacher try-on person image and compositing position information indicating a compositing position of a clothing image in the teacher try-on person image as output data;

deriving the output data including the compositing position information and the body shape parameter corresponding to the try-on person represented by the try-on person image using the try-on person image and the learning model; and generating a virtual try-on image by compositing the try-on person image and the clothing image using the derived output data, wherein the photographing unit and the second acquisition unit are controlled to perform photographing in synchronization with each other to acquire the try-on person image by the first acquisition unit and acquire the three-dimensional data by the second acquisition unit.

17. The virtual try-on computer program product according to claim 16, wherein the compositing position information is information indicating a composite target area of (1) a rectangular shape surrounding a try-on person region, or (2) a position of each apex of a rectangle surrounding the try-on person region, or (3) information indicating at least part of an external shape of the try-on person region, or (4) information indicating a specific portion of the try-on person in the teacher try-on person image.

18. An information processing device comprising:
a photographing unit configured to photograph a try-on person image;
a first acquisition unit configured to acquire the try-on person image photographed by the photographing unit;
a second acquisition unit configured to perform photographing and configured to acquire three-dimensional data of a try-on person by the photographing;
a learning unit configured to learn, by machine learning using three-dimensional data of a try-on person, a learning model using the try-on person image acquired by the first acquisition unit as input data of a teacher try-on person image, and using a body shape parameter indicating a body shape of the try-on person represented by the teacher try-on person image and compositing position information indicating a compositing position of a clothing image in the teacher try-on person image as output data;
a deriving unit configured to derive the output data including the compositing position information and the body shape parameter corresponding to the try-on person represented by the try-on person image using the try-on person image and the learning model; and
a generation unit configured to generate a virtual try-on image by compositing the try-on person image and the clothing image using the derived output data, wherein
the photographing unit and the second acquisition unit are controlled to perform photographing in synchronization with each other to acquire the try-on person image by the first acquisition unit and acquire the three-dimensional data by the second acquisition unit.

19. The information processing device according to claim 18, wherein the compositing position information is information indicating a composite target area of (1) a rectangular shape surrounding a try-on person region, or (2) a position of each apex of a rectangle surrounding the try-on person region, or (3) information indicating at least part of an external shape of the try-on person region, or (4) information indicating a specific portion of the try-on person in the teacher try-on person image.

* * * * *